United States Patent [19]

Jouwsma

[11] 4,427,030
[45] Jan. 24, 1984

[54] LAMINAR FLOW ELEMENT

[75] Inventor: Wijbren Jouwsma, Veenendaal, Netherlands

[73] Assignee: Bronkhorst High-Tech BV, Vorden, Netherlands

[21] Appl. No.: 364,475

[22] Filed: Apr. 1, 1982

[30] Foreign Application Priority Data

Sep. 22, 1981 [NL] Netherlands ............................ 8104354

[51] Int. Cl.³ ................................................ F15D 1/02
[52] U.S. Cl. ........................................ 138/42; 138/40
[58] Field of Search .......................... 138/40, 42, 37; 251/127; 137/625.28, 625.3

[56] References Cited

U.S. PATENT DOCUMENTS

| | | | |
|---|---|---|---|
| 2,118,295 | 5/1938 | Crawford et al. | 138/42 |
| 3,434,500 | 3/1969 | Burrows | 138/42 |
| 3,851,526 | 12/1974 | Drexel | 73/202 |
| 3,856,049 | 12/1974 | Scull | 138/42 |
| 4,079,754 | 3/1978 | Porter | 138/42 |

FOREIGN PATENT DOCUMENTS

| | | | |
|---|---|---|---|
| 1386417 | 3/1975 | United Kingdom . | |
| 746156 | 7/1980 | U.S.S.R. | 138/42 |

*Primary Examiner*—James E. Bryant, III

[57] ABSTRACT

A laminar flow element for mounting inside a fluid flow channel, which flow element is built up from flat disks which are provided with grooves running between an eccentrically made inlet opening and an outlet opening. The outer disks of a package do not have grooves and only comprise an inlet opening or an outlet opening. The inlet openings together form an inlet channel and the outlet openings together form an outlet channel. The dimensions of the grooves are such that the fluid flows laminar to the channels, formed by said grooves, between the inlet channel and the outlet channel.

11 Claims, 11 Drawing Figures

LAMINAR FLOW ELEMENT

The invention relates to a laminar flow element for mounting inside a fluid flow channel, which flow element is built up from flat disks, which are provided with grooves on one side ending in an outlet opening in the disk, which disks are piled up into a package on account of which the grooves form channels of such dimensions that the fluid flows laminar through said channels and the outlet openings together form an outlet channel.

A laminar flow element of this type is already described in the U.S.A. Pat. No. 3,851,526. Such laminar flow elements are, as illustrated in this American Pat. No. 3,851,526, applied for instance in fluid flow meters, in which the total fluid flow quantity in a fluid flow channel is measured on the basis of a small part of said fluid flow, branched from the main flow through a measuring channel in the form of a thin tube of such dimensions that the flow through said measuring channel is laminar. A first requirement for such measurements is, that the fluid flow is divided into a main flow and a measuring flow in such a way that there is a precise relationship between said two flows. To achieve that, the flow in the fluid flow channel itself must be laminar. That is realized by means of a flow element according to the U.S.A. Pat. No. 3,851,526, which is provided with a large number of flow channels in which the flow is laminar. Said laminar flow element is placed inside the fluid flow channel in such a way, that the fluid is forced to flow through channels in said flow element. In front and behind the laminar flow element a laminar measuring channel is connected to the fluid flow channel. To realize an accurate measurement the percentage of the fluid flowing through this measuring channel must be accurately known. Across the flow element, placed inside the main fluid channel a pressure drop is building up and as long as the flow is laminar the flow velocity is directly proportional to said pressure drop and inversely proportional to the viscosity. Depending on the dimensions a fixed relation can be determined between the flow in the measuring channel and the flow in the main channel. Details thereof are known to the expert in this field and need no further explanation.

The disks, from which the known flow element illustrated in the U.S.A. Pat. No. 3,851,526, is built up are provided with grooves running from the edge of the disk to a centrally positioned opening in the disk. During the installation of the disks inside the fluid flow channel, said disks are positioned with the aid of suitable expedients, for instance centralizing pins which run through further openings, specially intended thereto, or a pin having the same diameter as the central opening onto which the disks are received during assembly. The package of the disks, which are in this way correctly mutually positioned, is pressed inside the fluid flow channel against a thereto intended shoulder by means of a screw type element, which can be screwed into a part of the wall of the fluid flow channel upstream of said package, which wall part is provided with thread. This screw type element has a central bore extending from the upstream end of said element and furthermore a number of radial bores ending at one side into said central bore and ending at the other side in a space outside said screw type upstream of the package of disks.

During operation the fluid flows through the central bore and through said radial bores of the screw type element into the space between this screw type element and the channel wall and upstream of the package of disks. From said space the fluid flows through the grooves running from the cylindrical outer wall of said package of disks to the central opening of said package. Because this central opening is sealed at the upstream side of said package by the end wall of the screw type element the fluid will flow further downstreams to the fluid flow channel. A disadvantage of this construction is that the screw type element pressing the package of disks against the shoulder in the channel wall has a very complicated form because the fluid must be guided through radial openings into this screw type element to the cylindrical outer wall of the package of disks. Furthermore said screw type element takes care of the sealing of the central outlet opening at the upstream side.

Furthermore the shape of the channel and the dimensions of the disks must be chosen such, that there is sufficient free space left around said package of disks at the input side of the laminar flow channels through this package.

Furthermore separate auxiliary means in the form of centralizing elements are necessary during the mounting of a package of disks inside the fluid flow channel.

The total fluid resistance of this known flow element can be adapted by a suitable choice of the number of disks combined into one package. The greater this number of disks is, the smaller the total flow resistance will be. Based on one type of disks with all the same number of channels only a step by step variation in the flow resistance is possible. Only when disks having different numbers of channels are used it is possible to get a better approximation of a desired value of said flow resistance.

An object of the invention is now to eliminate at least partly the above mentioned disadvantages and to provide a laminar flow element which can be mounted in a simple way and with simple means and of which the flow resistance value can be adjusted much more accurately, whereas in principle disks of only one and the same type are used.

This object is reached with a laminar flow element of the above mentioned type which is characterized in that the grooves in the disks run between an excentrically made inlet opening and said outlet opening, which inlet openings together form an inlet channel and that the outer disks of a package do not have grooves and only comprise an inlet respectively outlet opening or openings.

Thereby it is achieved that the fluid enters the flow element on the frontside without the necessity to guide said fluid first to the cylindrical wall of the element.

According to a preferred embodiment of the invention both the inlet and outlet opening or openings are positioned excentrically. This gives the possibility of providing one central opening to be used for the mounting means during the assembly of a package of disks, such as a bolt and a nut. From a technical constructional point of view this leads to a very simple configuration.

In a further preferred embodiment of the element according to the invention each grooved disk comprises one inlet opening and one outlet opening diametrically opposite each other. Thereby the outer disks of the package only have one excentrically positioned opening, whereby the opening in the upstream front disk is aligned with the inlet openings of the intermediate disks and the opening in the down stream rear disk is aligned with the outlet openings of the intermediate disks.

With such an embodied flow element it is possible to place a number of packages of disks onto each other in such a way, that every time the downstream rear disk of one package at the same time functions as the upstream front disk of the next package succeeding in downstream direction. By this serial linking of packages it is possible to increase the flow resistance of the total combined element. By a correct choice of the number of disks per package and by a correct choice of the number of packages linked in series in this way a large variety of flow resistance values of the laminar flow element can be realized.

Further advantages and characteristics of the invention will become clear from the following more detailed description in which reference is made to the attached figures.

FIG. 1b illustrates a partial cross section through a disk of FIG. 1a according to line Ib in FIG. 1a.

FIG. 3b illustrates the analogue electrical diagram of the flow element according the FIG. 3a.

Figure 1A:
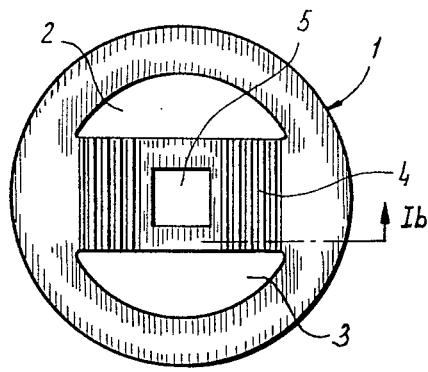
FIG. 1a illustrate a first embodiment of a flow disk for a laminar flow element according to the invention.
Figure 1B:

FIG. 1 illustrates a first embodiment of a disk, forming part of the laminar flow element according to the invention. Said round disk is provided with two diametrically opposed openings 2 and 3 with grooves 4 running between said openings into one side wall of said disk. As shown in FIG. 1a, openings 2 and 3 are equally spaced from the center of disk 1. The openings 2 and 3 in this embodiment have the shape of a crescent but may also have a different shape. Said disk has in the center a central square opening 5 which on the one hand functions to maintain said disks in the correct position and on the other hand offers the possibility to connect said disks onto each other for instance by means of a bolt and nut to assemble a package. It is of course also possible to use a round hole 5 and to maintain said disks in the correct position during assemblage by means of one or more adjusting pins. Another possibility is to form flat sides at a predetermined edge section which flat sides can be used for centering purposes during assembling of the package. FIG. 1b illustrates a partial cross section through the part of a disk containing the grooves 4, especially according to line Ib in FIG. 1a. Said grooves can be made in the disk for instance by means of etching, although also other methods may be applied. The dimensions of said grooves must be chosen such that, when the disks are placed onto each other and the grooves are forming channels, the flow through said channels is laminar. It is known to the expert in this field how said grooves have to be dimensioned to achieve a laminar flow. More details can be found for instance in said U.S.A. Pat. No. 3,851,526.

Figure 2:
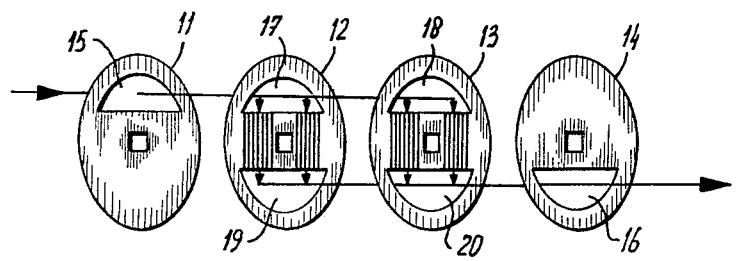
FIG. 2 illustrates the composition of a laminar flow element using the disks illustrated in FIG. 1.

FIG. 2 shows in a schematic way in which manner a laminar flow element can be built using said disks. Two disks of the type as illustrated in FIG. 1, i.e. the disks 12 and 13 are placed onto each other and at the front end rear side the disks 11 and 14 respectively are provided only having an input opening 15 respectively an output opening 16 and not containing grooves. As is schematically indicated by means of arrows in FIG. 2 the fluid will enter through the inlet opening 15 of the cover disk 11 and the therewith aligned openings 17 and 18 of the flow disks 12 and 13 respectively. Because said disks are lying close against each other the grooves 4 in each of the disks 12 and 13 are sealed by the respective neighbouring disk and are forming in that way channels through which the fluid will flow in a laminar way. Through these channels the fluid will reach the output openings 19 and 20 in the lower part of the disks 17 and 18 respectively, which outlet openings are aligned with the outlet opening 17 of the cover disk 14. Through this outlet opening the fluid leaves the laminar flow element as is indicated by arrows in the figure.

The flow resistance of this laminar flow element is dependent on the number of disks assembled together into one package. The larger the number of disks, the smaller the flow resistance. If only disks with one and the same number of grooves are used, then in this way only a step by step variation of the flow resistance is possible.

FIG. 3 indicates that, because of the configuration of the disks, it is possible to increase the flow resistance by serially linking further packages. The disks 21, 22, 23 and 24 are forming a package of disks similar to the package illustrated in FIG. 2. In FIG. 3 now the disks 25, 26 and 27 are added forming together with the disk 24 also a similar package. Together said disks 21 until 27 can be considered as the serially linked configuration of two packages of the type illustrated separately in FIG. 2. Also in this figure it is indicated by means of arrows in which way the fluid flows through this flow element. On account of this serial linking of packages the total flow resistance of said flow element has been increased.

This combination can be compared with an electrical resistance network in which groups of mutually parallel resistances are combined into a serial circuit. This electrical network illustrated in FIG. 3b is analogue to the combination of flow elements illustrated in FIG. 3a. The resistances 31, 32 and 33 and also the resistances 34, 35 and 36 are mutually connected in parallel. The combination of the resistances 31-33 is connected in series with the combination of the resistances 34-36. By adding further parallel resistances to or leaving resistances from a parallel combination of resistances 31-33 respectively 34-36, the total resistance of the combination in question can be raised respectively lowered, on account of which the total resistance of the network as a whole will increase respectively decrease. By serially adding further parallel combinations of resistances into this network it will be possible to increase the total resistance of the network as a whole. It will be clear to the expect in this field that, although identical resistances are used, by a suitable combination of the number of resistances into each parallel circuit and a suitable choice of the number of parallel circuits which is serially connected, it is possible to realize a large number of different resistance values for the network as a whole.

Figure 3A:
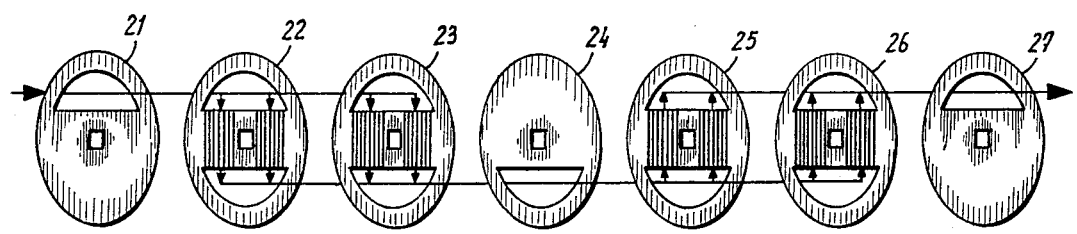
FIG. 3a illustrates the serial linking of packages assembled from disks illustrated in FIG. 1.
Figure 3B:
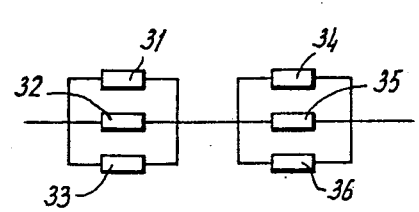

A corresponding situation applies to the serial linking of package with laminar flow disks as is illustrated in FIG. 3a. Using only disks having the same number of grooves, it is possible by varying the number of packages linked in series and the number of disks per package, to build up different resistance values, among which many which cannot be realized with one single package of disks.

Figure 4:
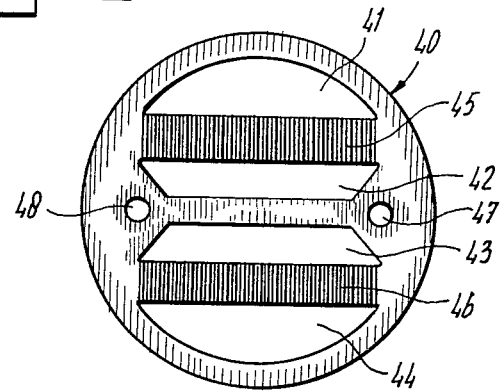
FIG. 4 illustrates a second embodiment of the flow disk for a laminar flow element according to the invention.

FIG. 4 illustrates a second embodiment of a disk which can be used into a flow element according to the invention. This disk is provided with four openings 41, 42, 43 and 44, which are made excentrically in the shown way. Between the openings 41 and 42 a first group of grooves 45 is running and a second group of grooves 46 is running between the openings 43 and 44. Furthermore mounting holes 47 and 48 are present to assemble said disks into a package by means of for instance two bolts and nuts.

Figure 5:
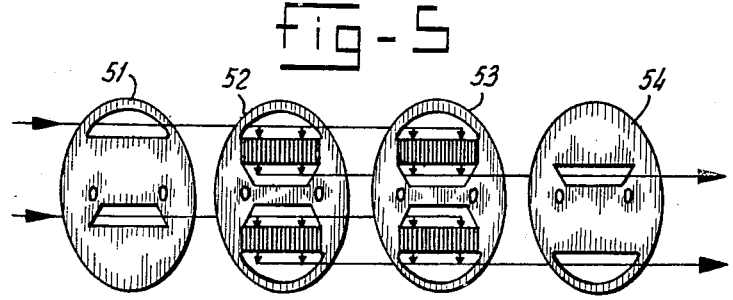
FIG. 5 illustrates the composition of a laminar flow element using the disks according to FIG. 4.

FIG. 5 illustrates in which way a number of disks 40 of the shape illustrated in FIG. 4 can be assembled together into a package and illustrates at the same time how the front and rear cover disks are embodied in this case. Also in this figure it is indicated by means of arrows how the fluid will flow via two parallel ways through the flow element. As appears from this figure the front cover disk 51 has only been provided with the openings 41 and 43, whereas the rear cover disk 54 has only the openings 42 and 44. The intermediate disks 52 and 53 are embodied as illustrated in FIG. 4.

As is illustrated in FIG. 5 the openings 41 serve as inlet openings for the upper passage way and the openings 42 serve as outlet openings therefore. For the lower way the openings 43 serve as inlet openings and the fluid leaves the element via the openings 44.

Also in this embodiment of the disks it is possible to link a number of packages, if required each with a different number of disks, in series in a way as schematically indicated in FIG. 3a, so that a large number of different resistance values can be realized.

Figure 7:
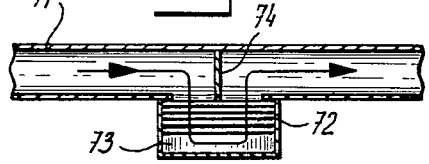
FIG. 7 illustrates the application of a laminar flow element according to FIG. 6.
Figure 9:
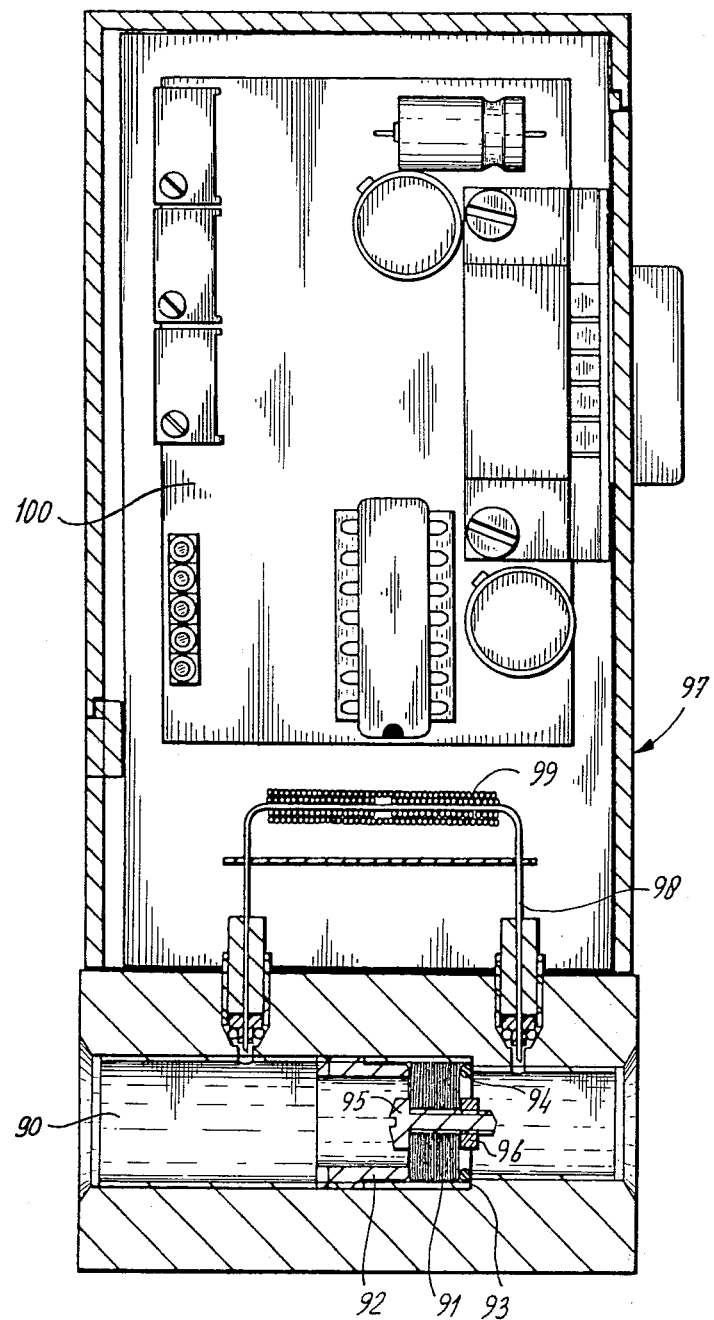
FIG. 9 illustrates schematically a mass flow meter in which a laminar flow element according to the invention is used.

The embodiment of the disk illustrated in FIG. 4 offers furthermore the possibility of mounting the laminar flow element in another way into the fluid channel. The laminar flow elements described so far, are in principle destined for mounting into a fluid channel itself in a way as is illustrated in FIG. 9. FIG. 7 illustrates another way of mounting the laminar flow element into the fluid flow channel. Inside the fluid channel 71 a baffle 74 is positioned in a way illustrated in FIG. 7. In the side wall of the fluid channel 71 an opening is made opposite the baffle 74. In a way which as schematically illustrated in FIG. 7 a package of disks 72 is thereafter placed on the side of the fluid channel 71. The means by which this package of disks is mounted are not illustrated in detail. The only important thing is that the baffle 74 closingly rests against the package of disks 72 and that there is a free space 73 underneath said package. The fluid is now forced to first pass this package of disks in one way to the free space 73 underneath said package as indicated by arrows and from there to pass the package of disks in a second direction to the downstream side of the fluid flow channel.

Figure 6:
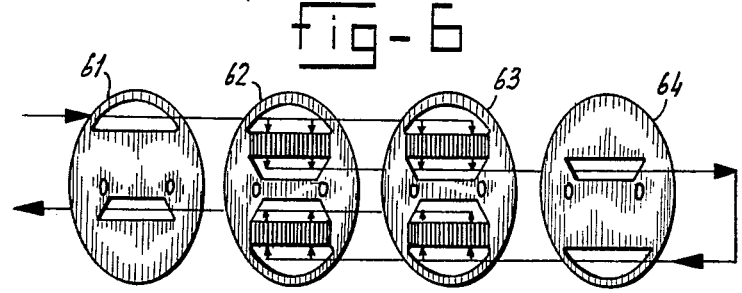
FIG. 6 illustrates a composition of a laminar flow element using the disks according to FIG. 4, destined for other way of mounting.

FIG. 6 illustrates for this situation in which way the fluid flows through the package of disks, comprising the front cover disk 61, the intermediate grooved disks 62 and 63 and the rear cover disk 64. The fluid flows as is indicated by arrows from the point of entry via the upper way, leaves the package at the right hand top corner and is forced to return via the bottom way.

The advantage of mounting the package of disks as is illustrated in FIG. 7 is, that the package is easily accessible for mounting and for maintenance without the necessaty to interfere in the fluid channel itself.

Figure 8:
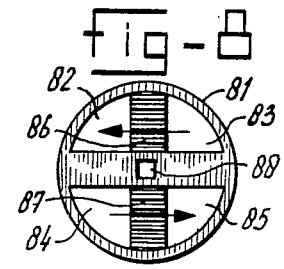
FIG. 8 illustrates a first embodiment of a flow disk for a laminar flow element according to the invention.

FIG. 8 illustrates a third embodiment of the flow disk according to the invention. The disk 81 has in this case four openings 82, 83, 84 and 85. The first group of grooves 86 runs between the opeings 82 and 83 and a second group of grooves 87 runs between the openings 84 and 85. In the middle of the disk a central square hole 88 is positioned functioning for centering and assembling purposes.

When a number of these disks is assembled together into a package with an upstream cover disk without grooves and only the openings 83 and 84 and a downstream cover disk without grooves and only the openings 82 and 85 then a flow element is created in which the fluid can flow via two passage ways in a similar way as illustrated in FIG. 5. In this example the fluid enters through the openings 83 or 84 and leaves the element via the openings 82 and 85. Also in this embodiment it is possible to link several packages having eventually a required different number of disks in serial configuration.

FIG. 9 finally illustrates an application of the flow element according to the invention in a mass flow meter 97. The package of disks 91 is mounted into the channel 90 by means of an externally threaded tube section 92, which is screwed into the left hand part of the channel 90, the inner wall of which is threaded, thereby pushing the package of disks 91 against a shoulder 93 inside said channel. To obtain a good sealing an O-ring seal 94 has been placed before the shoulder 93. The disks have first been assembled together into a package by means of the bolt 95 and nut 96 and trhereafter this package is mounted inside the channel 90 with the aid of the threaded element 92.

Before and after the disk package 91 a measuring channel 98 is connected to the flow channel. The windings 99 around the measuring channel 98 are delivering signals to the electronic circuit 100. Details of the circuit and details of the actual measurement can be found for instance in the already mentioned U.S.A. Pat. No. 3,851,526.

It will be clear that the invention is not limited to the illustrated embodiments, but that also several modifications and changes are possible within the scope of the invention. In the embodiments having a number of groups of grooves, for instance the numbers of grooves in each group can be different, so that the number of possibilities to vary the flow resistance value of a flow element built up from identical disks increases considerably.

It is also not necessary that the separate grooves in a group are running rectangular, they can also be emboldied in a non straight pattern.

I claim:

1. Laminar flow element for mounting inside a fluid flow channel comprising a package of a plurality of juxtaposed disks, each having a front surface and a rear surface, and each disk, except the front disk and the rear disk of the package of juxtaposed disks, having a first opening through said front and rear surface and a second opening through said front and rear surface and at least one conduit extending from the first opening to the second opening, said conduit comprising a channel on the front surface of said disk, said channel being closed on its side by the next adjacent juxtaposed disk and being dimensioned to provide laminar flow in said conduit, the front disk having a first opening and the rear disk having a second opening, the first openings of said plurality of disks being aligned and the second openings of said plurality of disks being aligned.

2. Laminar flow element according to claim 1, characterized in that each disk having a said conduit comprises only one inlet opening and one outlet opening diametrically opposite said inlet opening.

3. Laminar flow element according to claim 2, characterized in that each disk has a number of inlet openings and a corresponding number of outlet openings as well as a corresponding number of separate groups of grooves running between each pair of inlet/outlet openings.

4. Laminar flow element according to claim 3 characterized in that said element has an inlet and an outlet and is divided into a first segment adjacent said inlet and a second segment adjacent said outlet and each disk comprises an even number of pairs of channels and an inlet opening and an outlet opening corresponding to each said channel and further characterized in that one channel of each said pair is in said first segment of said element and the other member of said pair is in said second segment of said element, and exterior means are present to guide fluid flow from said element inlet via said first pair members to said second pair members and from there to said outlet.

5. Laminar flow element according to claim 1, characterized in that a number of packages has been placed onto each other in such a way that the rear disk of the one package serves at the same time as front disk of the adjoining package.

6. The laminar flow element of claim 1 in which the first openings and the second openings into said disks are spaced away from the center of the respective disk.

7. The laminar flow element of claim 1 in which the first opening and the second opening are spaced the same distance away from the center of the disk in diametrically opposite directions from the center of said disk.

8. The laminar flow element of claim 1, in which the package of juxtaposed disks is subdivided into a plurality of juxtaposed subpackages, each subpackage comprising a front disk having a first opening and a rear disk having a second opening, the front disk of each subpackage, except the subpackage that is furthest upstream, is positioned adjacent the rear disk of the adjacent upstream subpackage such that the first opening in said front disk is aligned with the second opening in said rear disk of said adjacent upstream package.

9. The laminar flow element of claim 8 in which the package juxtaposed disks is subdivided into a plurality of juxtaposed subpackages each with a front disk having a predetermined number of first openings and a rear disk having said number of second openings, the front disk of each subpackage, except the subpackage that is furthest upstream, being positioned in relation to the rear disk of the adjacent upstream subpackage such that each first opening in said front disk is aligned with a second opening in said rear disk of said upstream adjacent package.

10. The laminar flow element of claim 1 wherein said disks further comprise a first group of openings and a second group of openings, each said group comprising aligned inlet openings and aligned outlet openings, said first group comprising the same number of openings as said second group of openings, said element being mounted into a fluid flow channel having means for inhibiting a direct fluid flow between the upstream and downstream section of said fluid flow channel and having means for directing the incoming flow in the upstream section at the upstream side of the laminar flow element to the aligned inlet openings of the first group, and said element having furthermore means for directing the flow received from the outlet openings of the first group to the inlet openings of the second group and means for directing the flow received from the outlet openings of the second group to the downstream section of the fluid flow channel.

11. Laminar flow element for mounting inside a fluid flow channel comprising a plurality of juxtaposed disks, each having a front surface and a rear surface, each disk except the front disk and the rear disk of the package of juxtaposed disks having an even number of openings through said front and rear surfaces, said openings being arranged in a predetermined number of pairs, each of which comprises a first opening and a second opening, and at least one conduit extending in each group from the first opening of each pair to the second opening of each pair, each said conduit comprising a channel through the front surface of said disk, said channel being closed on its side by the next adjacent juxtaposed disk and being dimensioned to provide laminar flow in said conduit, the pairs being arranged such that the first openings of the pairs of said plurality of disks are aligned and the second openings of the pairs of said plurality of disks are aligned, the front disk having said predetermined number of first openings, each of which is aligned with one of said first openings into the above-mentioned disks and the rear disk having said predetermined number of second openings, each of which is aligned with one of said second openings into the above-mentioned disks.

* * * * *